United States Patent [19]

Ullrich

[11] Patent Number: 5,042,642
[45] Date of Patent: Aug. 27, 1991

[54] AUTOMATIC TRASH CART

[76] Inventor: Dennis R. Ullrich, 4601 Pine Castle Ave., Bakersfield, Calif. 93313

[21] Appl. No.: 498,963

[22] Filed: Mar. 26, 1990

[51] Int. Cl.⁵ ............................................. B65G 25/00
[52] U.S. Cl. .................................. 198/750; 104/172.3
[58] Field of Search ............................. 198/750, 748; 104/172.3

[56] References Cited

U.S. PATENT DOCUMENTS

| | | | |
|---|---|---|---|
| 875,685 | 1/1908 | Bighouse | 104/172.3 |
| 2,622,745 | 12/1952 | Roe | 198/748 X |
| 3,685,634 | 8/1972 | Bergling | 198/748 X |
| 3,865,228 | 2/1975 | Hufford | 198/748 |
| 4,044,886 | 8/1977 | Sender | 198/750 X |
| 4,308,945 | 1/1982 | Beckmann et al. | 198/750 |
| 4,556,141 | 12/1985 | Faitel | 198/750 |
| 4,703,240 | 10/1987 | Yoshimoto et al. | 318/587 |

FOREIGN PATENT DOCUMENTS 0076734  5/1984  Japan .................................. 198/750

Primary Examiner—Robert P. Olszewski
Assistant Examiner—Cheryl L. Gastineau

[57] ABSTRACT

A household trash delivery system that includes a rail structure extending from a point near the home to a point at the side of the street in front of the home. An endless power-driven chain extends within the rail structure for moving a trash receptacle cart therealong. The homeowner can use the trash delivery system to move heavy trash barrels from the home out to the curb without physically lifting or carrying the barrels from one point to another point. The system has special usefulness for elderly persons or handicapped persons, who may not be physically capable of carrying heavily-loaded trash barrels for any appreciable distance.

9 Claims, 1 Drawing Sheet

AUTOMATIC TRASH CART

BACKGROUND AND SUMMARY OF THE INVENTION

This invention relates to a household trash delivery system extending between the home and a point alongside the curb area in front of the home. A principal aim of the invention is to provide a trash delivery system that enables a homeowner to transport trash from his home to a curb-side location without having to carry the trash barrel through the intervening space.

Many people find it difficult or bothersome to move loaded trash barrels from their garages to the curb where the barrels can be emptied by employees of a garbage pick-up service. The barrel transporting task may be especially difficult for elderly persons or for women, or for disabled persons.

The present invention contemplates a trash barrel-transporting system that includes a hollow elongated rail structure extending at ground level between a barrel-loading zone near a person's garage or side door and a barrel-unloading zone at the side of the road in front of the person's home. Typically the rail structure would have a length varying between about forty feet and eighty feet, depending on the size of the lot and the orientation of the home on the lot.

A wheeled cart is arranged for back-and-forth motion along the rail structure. This cart has sufficient area to support two trash receptacles. In a typical situation the cart will have a length of about four feet and a width of about two feet. The cart has four ground wheels arranged in pairs near opposite ends of the cart. The cart is arranged in straddling relation to the rail structure, with the ground wheels spaced laterally outboard from the rail structure centerline in opposite directions.

An endless conveyor chain extends longitudinally within the rail structure so as to be movable through the space below the cart. The cart is connected to the chain at points near its opposite ends so that as the chain is propelled along the length of the rail it carries the cart from one end of the rail structure to the other end of the rail structure. The weight of the cart is borne by the laterally spaced ground wheels. The chain is required only to provide a horizontal propelling force for the cart.

A reversible electric motor is drivably connected to the endless conveyor chain, such that the cart can be mechanically moved from the home or garage out to the curb, and later moved back to the initial starting point (after the garbage serviceman has emptied the trash receptacles on the cart). This cart-transport system can be operated automatically by push button control, thereby eliminating the need for the homeowner to lift and carry loaded trash receptacles from the home out to the curb.

THE DRAWINGS

DESCRIPTION OF A PREFERRED EMBODIMENT OF THE INVENTION

Figure 1:
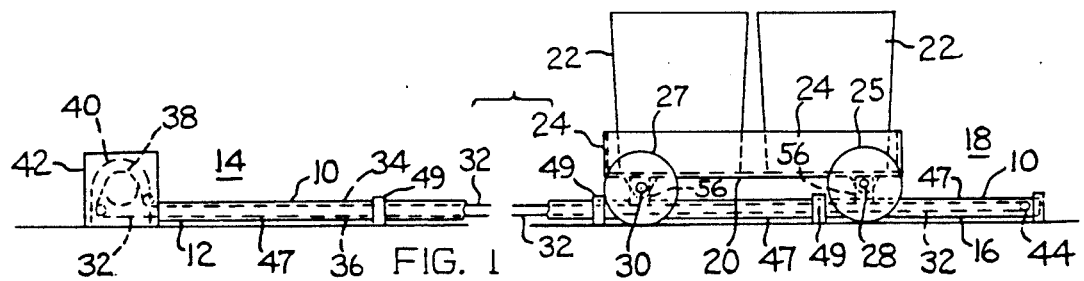
FIG. 1 is a fragmentary side elevational view of a trash delivery system constructed according to the invention.

FIG. 1 shows a trash delivery system that includes a generally horizontal straight rail structure 10 having a left end 12 adapted to define a trash barrel loading zone 14, and a right end 16 adapted to form a trash barrel unloading zone 18. Left end 12 of the rail structure will be located on the homesite in near proximity to the area where trash receptacles are stored; usually this area will be some point in the person's garage or alongside the garage. End 12 of the rail structure will be located outside the garage near the trash receptacle storage point. Right end 16 of the rail structure will be in near proximity to the side of the road in front of the person's house.

A wheeled cart 20 is arranged for movement over (and along) rail structure 10 for transporting trash receptacles 22 between loading zone 14 and unloading zone 18. The cart is preferably a flat rectangular platform having upstanding side walls 24 for retaining the trash receptacles 22 against inadvertent displacement off of the cart. The trash receptacles rest on the cart but are not fastened to the cart. Thus, the receptacles can be lifted off the cart when it is desired to empty the receptacles or when it is desired to replace empty receptacles with loaded receptacles.

Cart 20 has four ground wheels arranged in two pairs, i.e. two laterally spaced wheels 25 near the right end of the cart, and two laterally spaced wheels 27 near the left end of the cart. Each set of wheels, 25 or 27, has a dead (non-steerable) axle 28 or 30 extending transversely between the associated wheels. Typically the cart will have a length of about four feet and a width of about two feet; the ground wheels 25 or 27 will be located outside the width dimension of the cart, such that each axle (28 or 30) will have a length on the order of thirty inches. Each axle will be mounted in trunnions fastened to the cart undersurface. The axles can be rotary in nature, in which case the ground wheels will be fixed to the axles. Alternately, the axles can be fastened to the trunnions, in which case the ground wheels will be rotatably connected to the axles. The axles are fixed axis (non-steerable) axles.

An endless flexible conveyor chain 32 extends along and within rail structure 10. Chain 32 includes an upper run (main section) 34 and a lower run (main section) 36. The left end portion of the chain runs around a drive sprocket 38 that is affixed to the shaft of a reversible electric motor 40. The motor can be located within a small housing 42 connected to the left end of rail structure 10. One or more guide sprockets can also be engaged with the chain to guide it as it reverses direction within housing 42.

The right portion of the chain runs around a guide sprocket 44 as the chain again reverses its direction. As noted above, the chain is endless; the two main sections 34 and 36 of the chain move in opposite directions for a given direction of motor 40. The motor is reversible, such that the upper run (section) 34 can be moved to the left or to the right, depending on the rotational direction of the motor.

Figures 2, 3:
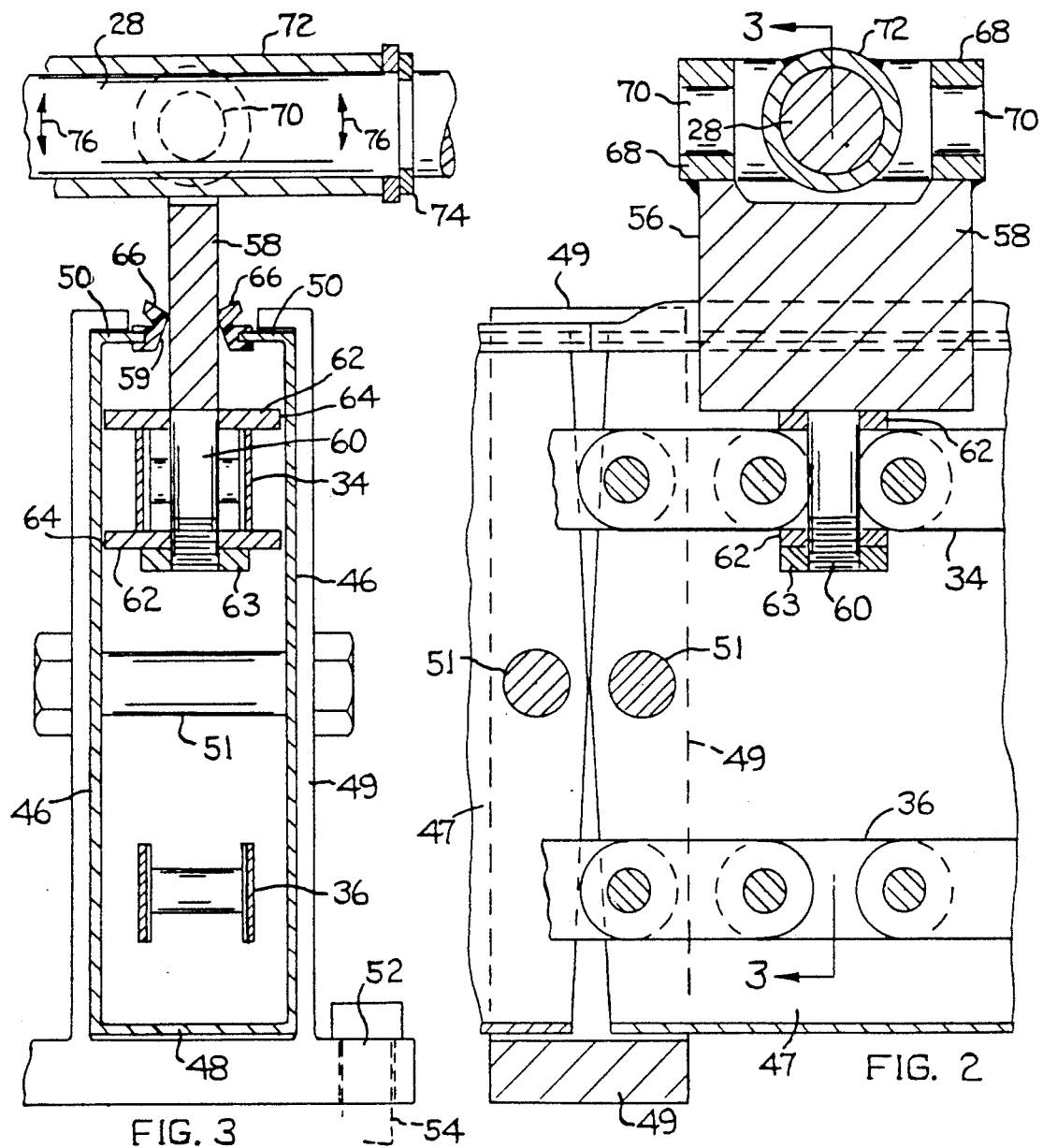
FIG. 2 is a fragmentary enlarged sectional view taken through a rail structure used in the FIG. 1 system.
FIG. 3 is a transverse sectional view taken on line 3—3 in FIG. 2.

Axles 28 and 30 of cart 20 are attached to chain 32 by means of two similarly constructed connectors 56; a representative one of these connectors is shown in some detail in FIGS. 2 and 3. When motor 40 is operating to move chain 32 the attached cart 20 will be moved along (over) rail structure 10. The cart is not supported by the rail structure; instead the ground wheels 25 and 27 are used to support the weight of the cart and associated trash receptacles.

Motor 40 can be turned on by an on-off manual switch located on housing 42. Alternately the motor can be energized from a remote point within the home by radio signal sending-receiving system. Such a system can be similar to systems already used to open or close garage doors. When the motor is energized by a manual switch the motor can be de-energized by limit switches located at opposite ends of rail structure 10.

This motor-operated system can be used to transport loaded trash receptacles from loading zone 14 to unloading zone 18. After the trash receptacles have been emptied the cart (with the receptacles thereon) can be returned to zone 14. It is possible to move more than two trash receptacles. The homeowner must lift the receptacles from the cart in order to send the cart back to loading zone 14 for additional receptacles.

Rail structure 10 will usually have a length of at least forty of fifty feet. It is not cost effective to form the entire rail structure out of a single rail element. A more cost effective approach is to form the rail structure out of a number of shorter rail units connected together in end-to-end relationship. As shown in FIG. 3, a representative rail unit can have a rectangular box-like cross section, that includes two closely spaced vertical side walls 46, a lower wall 48, and an upper wall 50. The cross sectional height of the rail unit is appreciably greater than its cross sectional width. In a typical construction the rail height will be on the order of two and one half inches; the width of the rail can be about one inch.

FIG. 2 shows fragmentary end portions of two rail units 47 joined together by a rail connector 49. Bolts 51 can be extended through aligned openings in the rail units and connector 49 to form an effective rail length that is twice the length of a single rail unit. As indicated in FIG. 1, each rail unit 47 is joined to another rail unit by a connector 49. The length of each rail unit is dictated primarily by the need for a convenient installation process, with low transportation and excavation expense. A rail unit length between three feet and eight feet is considered practical. The rail units can be formed of aluminum.

Connectors 49 serve as anchorage points for the rail structure. As shown fragmentarily in FIG. 3, feet 52 extend from the connector to receive anchor bolts 54. Each rail connector 49 can rest on a concrete pad that receives bolts 54 through feet 52.

It may be difficult to achieve a truly straight (linear) rail structure covering the entire distance between zones 14 and 18. To enable the rail units to follow terrain undulations the rail ends may be spaced slightly apart to permit one rail to tilt relative to the adjacent rail.

FIGS. 2 and 3 show some features of a connector 56 that can be used to attach a cart axle (28 or 30) to chain 32. The connector comprises a vertical plate 58 extending through a longitudinal slot 59 in rail structure 10; slot 59 extends the full length of the rail structure. A stud 60 extends downwardly from plate 58 through two transverse bars 62; a nut 63 is threaded onto the stud so that plate 58 is clamped to the chain. Ends 64 of bars 62 can serve as guides to prevent plate 58 from shifting transversely in slot 59.

The slot can be sealed against the entrance of wind and snow into the rail structure by means of two edge seals 66 fastened to edge areas of the slot. FIG. 3 shows seals 66 in upwardly deflected positions (due to the presence of plate 58). In their undeflected (normal) positions the free end edges of the seals 66 meet along the centerline of slot 59. The upstanding end edges of plate 58 can have chisel cross sections to promote upward deflection of seals 66.

Two short tubes 68 are welded or otherwise affixed to the upper edge of plate 58 to form pivot mountings for pins 70 that extend outwardly from a sleeve 72. Sleeve 72 encircles a cart axle 28. The axle can rotate in sleeve 72 or it can merely fit within the sleeve, depending on the axle-ground wheel relationship. Sleeve 72 is centrally located along axle 28, i.e. midway between the two ground wheels, not shown. E rings 74 can be inserted onto the axle to prevent relative axial motion between the sleeve and axle.

The sleeve-axle assembly can tilt around the axis of pivot pins 70 that extend right angularly from the sleeve. Arrows 76 depict the potential tilting motion of the sleeve-axle assembly. This tilting motion can occur when (if) the ground wheels 25 or 27 are rolling on undulations or irregularities in the terrain that deviate from the profile of rail structure 10. Pivot pins 70 hold sleeve 72 in a transverse plane extending crosswise of plate 58 and rail structure 10. Therefore the cart ground wheels will track along directional lines parallel to the rail centerline. The cart will maintain itself in a central position above the rail structure 10 while the cart is moving between zones 14 and 18.

The illustrated transport system is a relatively low cost system that can be installed without a great deal of expense. As shown in the drawings, the flexible conveyor element 32 is a conventional chain, e.g. the type of chain used in bicycles. Flexible element 32 could be a different structure, e.g. an endless cord or belt (toothed or plain). Rail structure 10 is described as an above-ground structure supported on concrete pads. However, the rail structure could be set into the ground if so desired; in that event each connector plate 58 would have to be lengthened to span the vertical spacing between the upper chain run 34 and the cart axle. Other changes and modifications can be made while still practicing the invention.

I claim:

1. A household trash delivery system comprising: a hollow elongated rail structure located at ground level between a trash barrel loading zone remote from the street and a trash barrel unloading zone in near proximity to the street;

a wheeled cart having two laterally spaced ground wheels at one of its ends, two laterally spaced ground wheels at its other end, and a dead axle extending transversely between each two ground wheels;

said cart having sufficient area to support at least two trash receptacles; said cart being positioned so that it straddles said rail structure, with its axles located above the rail structure and the ground wheels spaced laterally on either side of the rail structure centerline;

an endless flexible conveyor element operatively connected to the cart for moving said cart back and forth between the loading zone and the unloading zone; said endless conveyor element comprising a chain extending within the rail structure, said chain including two relatively straight parallel main chain sections extending along the length of the rail structure one above the other; said chain further including a first direction reversal section connecting the main chain sections at the loading zone, and a second direction reversal section connecting the main chain sections at the unloading zone;

a reversible electric motor at the loading zone, said motor having a rotary drive sprocket engaged with the chain at the first direction reversal section;

a rotary idler sprocket at the unloading zone engaged with the chain at the second direction reversal section so that the main chain sections move in opposite directions when the electric motor is operating; and a separate connector means extending downwardly from each axle to said one main chain section for transmitting drive forces from the chain to the cart.

2. The trash delivery system of claim 1, wherein each said connector means comprises a vertical plate extending upwardly from the chain on the rail structure centerline, a transverse sleeve encircling the cart axle at a central point therealong, and a pivot means interconnecting the sleeve and the vertical plate so that the sleeve can rock around a horizontal pivot axis within a vertical plane containing the rail structure centerline.

3. The trash delivery system of claim 2, and further comprising means preventing each said axle from axial dislocation along the associated sleeve.

4. The trash delivery system of claim 3, wherein each vertical plate is free to move vertically so that the associated sleeve and axle can move toward or away from the rail structure as the ground wheels traverse rough terrain.

5. The trash delivery system of claim 3, wherein said rail structure has a slot extending along its upper surface to accommodate movement of each vertical plate; and two edge seals extending along edge areas of the slot to close sections of the slot not occupied by the vertical plates.

6. The trash delivery system of claim 5, wherein said edge seals have free ends thereof normally engaged together on the slot centerline.

7. The trash delivery system of claim 6, wherein said rail structure is formed of a plural number of similarly constructed rail units connected together in end-to-end relationship.

8. A household trash delivery system comprising: a hollow elongated rail structure locatable at ground level between a trash barrel loading zone remote from the street and a trash barrel unloading zone in near proximity to the street;

a wheeled cart having two laterally spaced ground wheels at one of its ends, two laterally spaced ground wheels at its other end, and a dead axle extending transversely between each two ground wheels;

said cart having sufficient area to support at least two trash receptacles; said cart being positioned so that it straddles said rail structure, with its axles located above the rail structure and the ground wheels spaced laterally on either side of the rail structure centerline; said axles being spaced above the rail structure so that the axles maintain a clearance with respect to the rail structure as the ground wheels traverse uneven terrain;

said rail structure having a rectangular cross section that includes two closely-spaced vertical side walls, an upper wall, and a lower wall; said upper wall and said lower wall being widely spaced so that the cross sectional height of the rail structure is appreciably greater than its cross-sectional width; the upper wall of the rail structure having a slot extending therealong;

an endless flexible conveyor element extending along and within the rail structure, said flexible conveyor element comprising two relatively straight parallel main sections extending along the length of the rail structure, a first direction reversal section connecting said main sections at the loading zone, and a second directional reversal section connecting said main sections at the unloading zone;

a reversible electric motor at the loading zone, said motor having a rotary drive member drivably engaged with the flexible conveyor element at the first direction reversal section;

a rotary idler member at the unloading zone, said idler member being engaged with the flexible conveyor element at the second direction reversal section so that the main sections of the conveyor element move in opposite directions when the electric motor is operating; and two separate connector means between a main section of the flexible conveyor element and end areas of said cart, whereby motion of the conveyor element is transmitted to the cart;

each said connector means comprising a vertically extending member projecting upwardly from the flexible conveyor element through the slot in the rail structure upper wall and toward one of the cart axles, a transverse sleeve encircling a cart axle at a central point therealong, and a horizontal axis pivot means interconnecting said sleeve and the associated vertically extending member, whereby each said sleeve can rock around a horizontal pivot axis within a vertical plane containing the slot in the rail structure upper wall.

9. The trash delivery system of claim 8, wherein said endless flexible conveyor element is a chain arranged so that one of its main sections is located directly above its other main section; said rail structure being formed of a plural number of similarly constructed rail units connected together in end-to-end relationship.

* * * * *